(12) United States Patent
Morita (10) Patent No.: US 8,005,608 B2
(45) Date of Patent: Aug. 23, 2011

(54) FUEL INJECTION CONTROL APPARATUS AND FUEL INJECTION CONTROL METHOD FOR INTERNAL COMBUSTION ENGINE

(75) Inventor: Koji Morita, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 352 days.

(21) Appl. No.: 12/301,625

(22) PCT Filed: Jul. 23, 2007

(86) PCT No.: PCT/IB2007/002074
§ 371 (c)(1),
(2), (4) Date: Nov. 20, 2008

(87) PCT Pub. No.: WO2008/012638
PCT Pub. Date: Jan. 31, 2008

(65) Prior Publication Data
US 2009/0271091 A1     Oct. 29, 2009

(30) Foreign Application Priority Data

Jul. 24, 2006   (JP) ................................. 2006-200693

(51) Int. Cl.
*F02M 7/28* (2006.01)
*F02B 17/00* (2006.01)
(52) U.S. Cl. ........ 701/113; 123/295; 123/299; 123/430; 123/435; 123/491
(58) Field of Classification Search .......... 701/103–105, 701/110, 113; 123/295, 299, 300, 305, 435, 123/436, 491, 443, 430
See application file for complete search history.

(56) References Cited

U.S. PATENT DOCUMENTS

| 5,937,822 | A  | * | 8/1999  | Nakajima ..................... 123/295 |
| 6,062,191 | A  | * | 5/2000  | Ooba ............................. 123/295 |
| 6,109,223 | A  |   | 8/2000  | Motoyama et al. |
| 6,978,762 | B2 |   | 12/2005 | Mori |
| 7,055,500 | B2 | * | 6/2006  | Miyashita et al. ....... 123/406.47 |
| 7,270,112 | B2 | * | 9/2007  | Kinose .......................... 123/431 |
| 7,599,787 | B2 | * | 10/2009 | Hokuto et al. ................ 701/113 |
| 2003/0074337 | A1 |  | 4/2003  | Sadakuni |
| 2006/0016430 | A1 |  | 1/2006  | Sadakane et al. |

FOREIGN PATENT DOCUMENTS

EP          0 980 969         2/2000

(Continued)

*Primary Examiner* — Hai H Huynh
(74) *Attorney, Agent, or Firm* — Oblon, Spivak, McClelland, Maier & Neustadt, L.L.P.

(57) ABSTRACT

A fuel injection control apparatus for an internal combustion engine includes a fuel injection portion that performs each of first fuel injection for performing stratified-charge combustion, and second fuel injection for performing homogeneous-charge combustion; and an injection distribution ratio control portion that controls an injection distribution ratio. The injection distribution ratio control portion controls the injection distribution ratio to a target injection distribution ratio set based on a predetermined engine condition after start of the engine. An initial injection distribution ratio is set based on an engine condition at a time of start of the engine, and a change in the injection distribution ratio is controlled by referring to the engine condition after the start of the engine, when the injection distribution ratio is changed from the initial injection distribution ratio to the target injection distribution ratio.

13 Claims, 6 Drawing Sheets

FOREIGN PATENT DOCUMENTS

| | | |
|---|---|---|
| JP | 2000 8916 | 1/2000 |
| JP | 2001 73913 | 3/2001 |
| JP | 2005 220887 | 8/2005 |
| JP | 2005 325825 | 11/2005 |
| JP | 2006 161799 | 6/2006 |
| JP | 2008-25502 * | 2/2008 |
| WO | 2006 103902 | 10/2006 |

* cited by examiner

FUEL INJECTION CONTROL APPARATUS AND FUEL INJECTION CONTROL METHOD FOR INTERNAL COMBUSTION ENGINE

BACKGROUND OF THE INVENTION

1. Field of the Invention

The invention relates to a fuel injection control apparatus and a fuel injection control method for an internal combustion engine, which control the condition of combustion between stratified-charge combustion and homogeneous-charge combustion by changing a mode in which fuel is injected.

2. Description of the Related Art

Japanese Patent Application Publication No. 2005-220887 (JP-A-2005-220887) describes a fuel injection control apparatus for an internal combustion engine, which supplies fuel to a combustion chamber by selectively using an injector for cylinder injection and an injector for intake port injection, according to the operating condition of the internal combustion engine. When the operating condition of the internal combustion engine is changed from an operating condition where one of the injectors injects the fuel to an operating condition where the other injector injects the fuel, the fuel injection control apparatus gradually decreases the proportion of the amount of fuel to be injected from the one injector, and gradually increases the proportion of the amount of fuel to be injected from the other injector during a predetermined transitional period to suppress fluctuations of torque. In addition, Japanese Patent Application Publication No. 2000-8916 (JP-A-2000-8916) describes a technology related to the invention.

An example of the fuel injection control apparatus that includes two types of injectors, that is, the injector for cylinder injection and the injector for intake port injection has been put into practical use. The fuel injection control apparatus uses the fuel injection from the injector for intake port injection and the fuel injection from the injector for cylinder injection in combination for one combustion stroke, to achieve the optimum condition of combustion. In the fuel injection control apparatus, the condition of combustion is changed according to an injection distribution ratio, that is, a ratio between the amounts of fuel to be injected from the injectors. The amount of pollutants discharged from the internal combustion engine is changed according to the change in the condition of combustion. Accordingly, an injection distribution ratio that is appropriate for an operating condition where the fuel injection from the injector for intake port injection and the fuel injection from the injector for cylinder injection are used in combination (for example, a first idling condition after the start of the engine) is determined in advance, for example, through an adaptability test, and the determined value is set as a target injection distribution ratio. The fuel injection operations of the injectors are controlled to achieve the target injection distribution ratio.

When an engine condition at the time of start of the engine differs from the engine condition based on which the target injection distribution ratio is determined, and the fuel injection control is executed according to the target injection distribution ratio, the optimum condition of combustion may not necessarily be achieved. For example, it may be not appropriate to control the injection distribution ratio to the target injection distribution ratio, due to the influence of a lean limit that is one of factors that impose restrictions on the combustion control. The lean limit is the limit value of an air-fuel ratio, above which combustion is not performed. That is, if the air-fuel ratio is on the lean side of the lean limit (the air-fuel ratio is above the lean limit, i.e., the amount of air is excessively large with respect to the amount of fuel), combustion is not performed. The lean limit moves toward a rich side (i.e., the lean limit decreases), as an engine temperature decreases. Therefore, when an engine temperature at the time of the start of the engine is below the engine temperature based on which the target injection distribution ratio is set, and the injection distribution ratio is controlled to the target injection distribution ratio, the air-fuel ratio exceeds the lean limit, and combustion may not be performed. In this case, it is effective to control the injection distribution ratio to promote the stratification of the air-fuel mixture and to ensure that the air-fuel mixture at the air fuel ratio equal to or below the lean limit is present around an ignition plug, by changing the injection distribution ratio so that the amount of fuel to be injected from the cylinder injection is increased.

However, the injection distribution ratio only temporarily needs to be changed from the target injection distribution ratio. Thus, it is preferable to return the injection distribution ratio to the target injection distribution ratio when the engine condition is changed to the predetermined engine condition based on which the target injection distribution ratio is set. In this case, when the injection distribution ratio is changed only in the predetermined transitional period as described in the publication No. 2005-220887, the injection distribution ratio is not necessarily changed in accordance with the change in the engine condition in the predetermined transitional period. As a result, for example, a misfire may occur, or the amount of pollutants contained in exhaust gas may be increased, depending on the operating condition of the engine.

SUMMARY OF THE INVENTION

The invention provides a fuel injection control apparatus and a fuel injection control method for an internal combustion engine, which appropriately change an injection distribution ratio while appropriately maintaining the operating condition of the internal combustion engine, after the start of the internal combustion engine.

A first aspect of the invention relates to a fuel injection control apparatus for an internal combustion engine. The fuel injection control apparatus includes a fuel injection portion that performs each of first fuel injection for performing stratified-charge combustion, and second fuel injection for performing homogeneous-charge combustion; and an injection distribution ratio control portion that controls an injection distribution ratio that is a ratio between an amount of fuel to be injected in the first fuel injection for one combustion stroke, and an amount of fuel to be injected in the second fuel injection for the one combustion stroke. The injection distribution ratio control portion controls the injection distribution ratio to a target injection distribution ratio that is set based on a predetermined engine condition, when the internal combustion engine is in the predetermined engine condition. The injection distribution ratio control portion includes an initial injection distribution ratio setting portion that sets an initial injection distribution ratio based on an engine condition at a time of start of the internal combustion engine, and a change control portion that controls a change in the injection distribution ratio by referring to the engine condition after the start of the internal combustion engine, when the injection distribution ratio is changed from the initial injection distribution ratio to the target injection distribution ratio.

According to the first aspect, when it is not appropriate to control the injection distribution ratio to the target injection distribution ratio because the engine condition at the time of the start of the engine differs from the predetermined engine condition based on which the target injection distribution ratio is set, the initial injection distribution ratio setting portion sets the initial injection distribution ratio that differs from the target injection distribution ratio, according to the engine condition at the time of the start of the engine. The injection distribution ratio control portion controls the injection distribution ratio according to the initial injection distribution ratio. After the start of the engine, the change control portion controls the change in the injection distribution ratio by referring to the change in the engine condition after the start of the engine. When the engine condition changes to the predetermined engine condition, the change control means controls the injection distribution ratio to the target injection distribution ratio. When the injection distribution ratio is changed from the initial injection distribution ratio to the target injection distribution ratio, the change in the injection distribution ratio is controlled by referring to the engine condition after the start of the engine. Therefore, the injection distribution ratio is appropriately changed in accordance with the change in the engine condition. Thus, it is possible to appropriately change the injection distribution ratio while appropriately maintaining the operating condition of the internal combustion engine.

In the first aspect, the fuel injection portion may include a first injector that injects the fuel into a cylinder, and a second injector that injects the fuel into an intake port. The first fuel injection may be fuel injection from the first injector in a compression stroke. The second fuel injection may be fuel injection from the second injector. Alternatively, in the first aspect, the fuel injection portion may include an injector that injects the fuel into a cylinder. The first fuel injection may be fuel injection from the injector in a compression stroke. The second fuel injection may be fuel injection from the injector in an intake stroke.

In the above-described aspect, the change control portion may control the change in the injection distribution ratio by referring to a physical amount correlated with an engine temperature, as the engine condition.

According to the above-described aspect, when the engine temperature at the time of the start of the engine is below the engine temperature based on which the target injection distribution ratio is set, the initial injection distribution ratio, which differs from the target injection distribution ratio, is set according to the engine temperature at the time of the start of the engine. Also, the injection distribution ratio is controlled from the initial injection distribution ratio to the target injection distribution ratio, according to the increase in the engine temperature.

Further, in the above-described aspect, the change control portion may refer to at least one of a temperature of coolant for the internal combustion engine and an accumulated value of an intake air amount, which is obtained by accumulating the intake air amount from the time of the start of the internal combustion engine, as the physical amount correlated with the engine temperature.

According to the above-described aspect, the temperature of the internal combustion engine is determined relatively easily, and the determined temperature of the internal combustion engine is reflected in the control of the injection distribution ratio.

In the above-described aspect, the target injection distribution ratio may be set to the injection distribution ratio at which an amount of hydrocarbon discharged from the internal combustion engine is minimized when an engine temperature is in a predetermined temperature range. When the engine temperature is below the lower limit of the predetermined temperature range, the initial injection distribution ratio setting portion may set the initial injection distribution ratio so that a proportion of the amount of fuel to be injected in the first fuel injection is increased as compared to the target injection distribution ratio.

According to the above-described aspect, when the initial injection distribution ratio is set to the injection distribution ratio at which the proportion of the amount of fuel to be injected in the first fuel injection is increased as compared to the target injection distribution ratio, that is, when the proportion of the amount of fuel to be injected for performing the stratified-charge combustion is increased, the amount of discharged HC is increased as compared to when the control is executed according to the target injection distribution ratio. However, the degree to which the amount of discharged HC is increased is smaller than that when the proportion of the amount of fuel to be injected in the second fuel injection is increased.

Further, in the above-described aspect, when the engine temperature at the time of the start of the internal combustion engine is below the lower limit of the predetermined temperature range so that an air-fuel ratio is above a lean limit if the injection distribution ratio is controlled to the target injection distribution ratio, the initial injection distribution ratio setting portion may set the initial injection distribution ratio so that the proportion of the amount of fuel to be injected in the first fuel injection is increased until the air-fuel ratio is equal to or below the lean limit.

According to the above-described aspect, when the engine temperature at the time of the start of the engine is below the engine temperature based on which the target injection distribution ratio is set, it is possible to ensure that the air-fuel ratio is equal to or below the lean limit, and to ensure the stability of the operation of the internal combustion engine.

In the above-described aspect, the change control portion may control the change in the injection distribution ratio according to an increase in the engine temperature after the start of the internal combustion engine so that the injection distribution ratio at which the amount of discharged hydrocarbon is minimized is selected in a range where the air-fuel ratio is maintained at or below the lean limit.

According to the above-described aspect, it is possible to appropriately control the injection distribution ratio to the target injection distribution ratio according to the increase in the engine temperature, to maintain the air-fuel ratio at or below the lean limit, and to minimize the amount of discharged HC.

In the above-described aspect, a sum of the amount of fuel to be injected in the first fuel injection performed by the fuel injection portion and the amount of fuel to be injected in the second fuel injection performed by the fuel injection portion may be set to achieve an air-fuel ratio at which an exhaust gas purification rate is highest in the internal combustion engine.

A second aspect of the invention relates to a fuel injection control method for an internal combustion engine. In the fuel injection control method, first fuel injection is performed for performing stratified-charge combustion, and second fuel injection is performed for performing homogeneous-charge combustion; and an injection distribution ratio, which is a ratio between an amount of fuel to be injected in the first fuel injection for one combustion stroke, and an amount of fuel to be injected in the second fuel injection for the one combustion stroke, is controlled. The fuel injection control method includes controlling the injection distribution ratio to a target injection distribution ratio that is set based on a predetermined engine condition, when the internal combustion engine is in the predetermined engine condition; setting an initial injection distribution ratio based on an engine condition at a time of start of the internal combustion engine; and controlling a change in the injection distribution ratio by referring to the engine condition after the start of the internal combustion engine, when the injection distribution ratio is changed from the initial injection distribution ratio to the target injection distribution ratio.

In the above-described aspect, the target injection distribution ratio may be set to the injection distribution ratio at which an amount of hydrocarbon discharged from the internal combustion engine is minimized when an engine temperature is in a predetermined temperature range. When the engine temperature is below the lower limit of the predetermined temperature range, the initial injection distribution ratio may be set so that a proportion of the amount of fuel to be injected in the first fuel injection is increased as compared to the target injection distribution ratio.

In the above-described aspect, when the engine temperature at the time of the start of the internal combustion engine is below the lower limit of the predetermined temperature range so that an air-fuel ratio is above a lean limit if the injection distribution ratio is controlled to the target injection distribution ratio, the initial injection distribution ratio may be set so that the proportion of the amount of fuel to be injected in the first fuel injection is increased until the air-fuel ratio is equal to or below the lean limit.

In the above-described aspect, the change in the injection distribution ratio may be controlled according to an increase in the engine temperature after the start of the internal combustion engine so that the injection distribution ratio at which the amount of discharged hydrocarbon is minimized is selected in a range where the air-fuel ratio is maintained at or below the lean limit.

A third aspect of the invention relates to a fuel injection control apparatus for an internal combustion engine. The fuel injection control apparatus includes fuel injection means for performing each of first fuel injection for performing stratified-charge combustion, and second fuel injection for performing homogeneous-charge injection; and injection distribution ratio control means for controlling an injection distribution ratio that is a ratio between an amount of fuel to be injected in the first fuel injection for one combustion stroke, and an amount of fuel to be injected in the second fuel injection for the one combustion stroke. The injection distribution ratio control means controls the injection distribution ratio to a target injection distribution ratio that is set based on a predetermined engine condition, when the internal combustion engine is in the predetermined engine condition. In the fuel injection control apparatus, the injection distribution ratio control means includes initial injection distribution ratio setting means for setting an initial injection distribution ratio based on an engine condition at a time of start of the internal combustion engine, and change control means for controlling a change in the injection distribution ratio by referring to the engine condition after the start of the internal combustion engine, when the injection distribution ratio is changed from the initial injection distribution ratio to the target injection distribution ratio.

As described above, the fuel injection control apparatus according to the invention controls the change in the injection distribution ratio that is the ratio between the amount of fuel to be injected in the first fuel injection for performing the stratified-charge combustion, and the amount of fuel to be injected in the second fuel injection for performing the homogeneous-charge combustion, by referring to the engine condition after the start of the engine, when the injection distribution ratio is changed from the initial injection distribution ratio to the target injection distribution ratio. Thus, the injection distribution ratio is appropriately changed in accordance with the change in the engine condition. Accordingly, it is possible to appropriately change the injection distribution ratio while appropriately maintaining the operating condition of the internal combustion engine.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Figure 1:
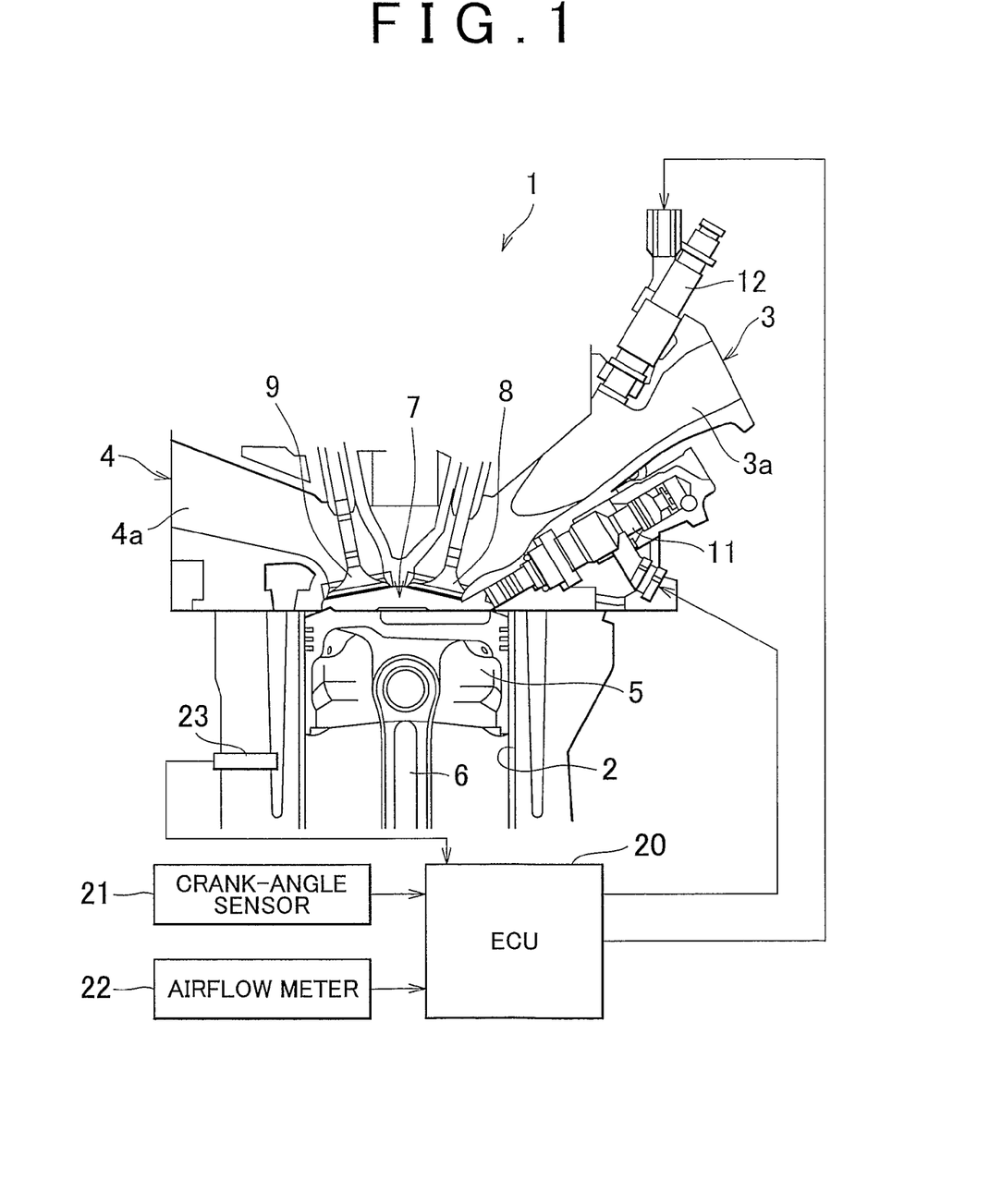
FIG. 1 is a diagram showing the main portion of an internal combustion engine to which a fuel injection control apparatus according to an embodiment of the invention is applied.

FIG. 1 shows the main portion of an internal combustion engine to which a fuel injection control apparatus according to an embodiment of the invention is applied. The internal combustion engine (hereinafter, simply referred to as "engine") 1 is a spark-ignition internal combustion engine in which a plurality of cylinders 2 is appropriately arranged. FIG. 1 shows only one cylinder 2. Each cylinder 2 is provided with an intake passage 3 and an exhaust passage 4. A piston 5, which is connected to a crankshaft (not shown) via a connecting rod 6, is inserted in each cylinder 2 such that the piston 5 reciprocates. In each cylinder 2, an ignition plug (not shown) is provided on a substantially central axis of the cylinder 2 such that the electrode portion of the ignition plug protrudes. The intake passage 3 includes an intake port 3a for each cylinder 2. The exhaust passage 4 includes an exhaust port 4a for each cylinder 2. The intake port 3a and the exhaust port 4a lead to a combustion chamber 7. An intake valve 8 opens and closes to allow and interrupt communication between the intake port 3a and the combustion chamber 7. An exhaust valve 9 opens and closes to allow and interrupt communication between the exhaust port 4a and the combustion chamber 7. The intake valve 8 and the exhaust valve 9 are driven by a known valve operating mechanism or a known variable valve operating mechanism. As is generally known, an exhaust gas purification catalyst (not shown) is provided in the exhaust passage 4.

A first injector 11 and a second injector 12 are provided in the internal combustion engine 1 to supply fuel to each cylinder 2. The first injector 11 is a fuel injection valve that directly injects the fuel into the cylinder 2. The second injector 12 is a fuel injection valve that injects the fuel into the intake port 3a (intake passage 3).

An engine control unit (ECU) 20 controls the fuel injection operations performed by the injectors 11 and 12. The ECU 20 is configured as a computer unit that includes a microprocessor, and peripheral devices such as a storage device required for the operation of the microprocessor. As shown in FIG. 1, the ECU 20 is connected to a crank-angle sensor 21, an airflow meter 22, a coolant-temperature sensor 23, and the other sensors. The crank-angle sensor 21 outputs a signal corresponding to an engine speed (engine revolutions) Ne. The airflow meter 22 outputs a signal corresponding to an intake air amount Ga. The coolant-temperature sensor 23 detects a coolant temperature Tw that is the temperature of coolant for the internal combustion engine 1. The other sensors are not shown in FIG. 1.

The ECU 20 calculates a basic fuel injection amount based on the engine speed Ne determined based on the signal output from the crank-angle sensor 21, and the intake air amount Ga determined based on the signal output from the airflow meter 22. Then, the ECU 20 calculates a final fuel injection amount by correcting the basic fuel injection amount according to various pieces of information. Then, the ECU 20 controls the operating condition of the engine 1 to a target operating condition by controlling a period during which each of the injectors 11 and 12 injects the fuel, based on the final fuel injection amount.

The ECU 20 appropriately controls the condition of combustion in the engine 1 between stratified-charge combustion and homogeneous-charge combustion, according to the operating condition of the engine 1, by appropriately using the fuel injection from the first injector 11 and the fuel injection from the second injector 12 in combination, or selectively using the fuel injection from the first injector 11 and the fuel injection from the second injector 12. For example, immediately after an engine cold start, the fuel injection from the second injector 12 is used in combination with the fuel injection from the first injector 11 in the late stage of a compression stroke. Thus, an air-fuel mixture is stratified, and weak stratified-charge combustion is performed. During low-to-middle load operation, the fuel injection from the second injector 12 is used in combination with the fuel injection from the first injector 11 in the early stage of an intake stroke, or the fuel injection from the second injector 12 and the fuel injection from the first injector 11 are selectively used. Thus, the air-fuel mixture is homogeneously dispersed in the combustion chamber 7, and accordingly the homogeneous-charge combustion is performed.

When the fuel injection from the first injector 11 in the late stage of the compression stroke is used in combination with the fuel injection from the second injector 12, the ECU 20 controls an injection distribution ratio that is a ratio of the amount of fuel to be injected from the second injector 12 to the sum of the amounts of fuel to be injected from the first injector 11 and the second injector 12, according to a predetermined control law. The injection distribution ratio is a value (Wp/(Wd+Wp)) expressed in percentage, which is obtained by dividing a fuel amount Wp by the sum (Wd+Wp) of a fuel amount Wd and the fuel amount Wp. The fuel amount Wd is the amount by weight of fuel to be injected from the first injector 11 in the compression stroke for one combustion stroke, and the fuel amount Wp is the amount by weight of fuel to be injected from the second injector 12 for the one combustion stroke. Hereinafter, the fuel amount Wd, which is the amount of fuel to be injected from the first injector 11 in the compression stroke, may be referred to as "cylinder injection amount". The fuel amount Wp, which is the amount of fuel to be injected from the second injector 12, may be referred to as "port injection amount".

Figure 2:
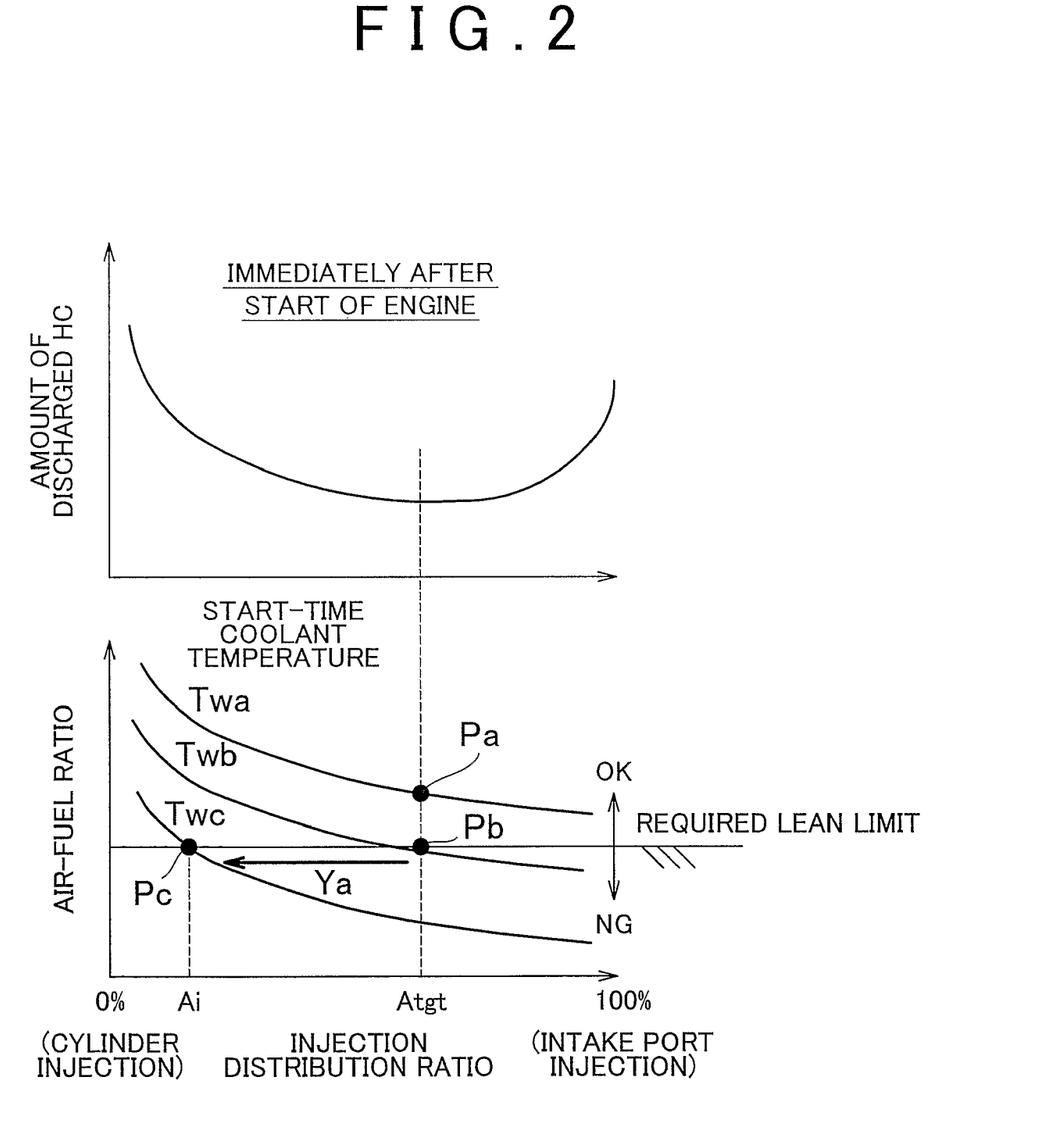
FIG. 2 is a diagram showing the relation between an injection distribution ratio and the amount of HC contained in exhaust gas, and the relation between the injection distribution ratio and an air-fuel ratio, immediately after the start of the internal combustion engine, in the embodiment of the invention.

As an aspect of the control of the above-described injection distribution ratio, the control of the injection distribution ratio executed when the engine 1 starts will be hereinafter described. FIG. 2 shows the relation between the injection distribution ratio and the amount of HC (hydrocarbon) contained in exhaust gas discharged from the engine 1, and the relation between the injection distribution ratio and an air-fuel ratio, immediately after the start of the engine 1. In FIG. 2, the horizontal axis indicates the injection distribution ratio, and the vertical axis indicates the amount of discharged HC, and the air-fuel ratio. As shown in FIG. 2, the amount of discharged HC is correlated with the injection distribution ratio. When the proportion of the cylinder injection amount is extremely high, and when the proportion of the port injection amount is extremely high, the amount of discharged HC is large. Accordingly, it is preferable to set the injection distribution ratio to a target injection distribution ratio Atgt at the time of the start of the engine. The target injection distribution ratio Atgt is an injection distribution ratio at which the amount of discharged HC is minimized. In the operating condition immediately after the start of the engine 1, there is a required lean limit. The required lean limit is an air-fuel ratio determined based on the air-fuel ratio of approximately 15.0 at which the exhaust gas purification rate of the exhaust gas purification catalyst is highest, talking into account the tolerance of components such as the injectors 11 and 12. The required lean limit is the air-fuel ratio of approximately 16.5 when the tolerance of 10% is taken into account. The amounts of fuel to be injected from the injectors 11 and 12 are set to achieve the required lean limit air-fuel ratio.

During the control of the combustion in the engine 1, there is the lean limit as described above. The lean limit changes toward a rich-side (i.e., the lean limit decreases) as the temperature of the engine 1 (engine temperature) decreases. In FIG. 2, the curves show the lean limit air fuel ratios at three coolant temperatures Twa, Twb, and Twc (Twa>Twb>Twc) that represent the engine temperature. When the injection distribution ratio is set to the target injection distribution ratio Atgt, and the lean limit air-fuel ratio at the coolant temperature at the time of the start of the engine (hereinafter, referred to as "start-time coolant temperature") is on the solid line showing the required lean limit air-fuel ratio, or on the lean side of the solid line (i.e., the lean limit air-fuel ratio at the start-time coolant temperature is equal to or above the required lean limit air-fuel ratio), combustion is performed. For example, the lean limit at the coolant temperature Twa is at the point Pa that is on the lean side of the solid line showing the required lean limit (i.e., the lean limit at the coolant temperature Twa is above the required lean limit). The lean limit at the coolant temperature Twb is at the point Pb that is on the solid line showing the required lean limit (i.e., the lean limit at the coolant temperature Twb matches the required lean limit). Therefore, when the coolant temperature is equal to or above the coolant temperature Twb, the stability of the operation of the engine 1 is ensured by setting the injection distribution ratio to the target injection distribution ratio Atgt, and controlling the air-fuel ratio to the required lean limit, immediately after the start of the engine 1. That is, when the coolant temperature is equal to or above the coolant temperature Twb, the engine 1 is stably operated by setting the injection distribution ratio to the target injection distribution ratio Atgt.

However, when the start-time coolant temperature is below the coolant temperature Twb, the intersection point between the dash line showing the target injection distribution ratio Atgt and the curve showing the lean limit is on the rich side of the point Pb showing the required lean limit (i.e., the intersection point is below the point Pb). Therefore, when the start-time coolant temperature is below the coolant temperature Twb, combustion is not performed and a misfire or the like may occur if the injection distribution ratio is set to the target injection distribution ratio Atgt, and the air-fuel ratio is controlled to the required lean limit. Accordingly, for example, when the start-time coolant temperature is equal to the coolant temperature Twc, the injection distribution ratio is set to an initial injection distribution ratio Ai at which the air-fuel ratio is maintained at or below the lean limit, by increasing the proportion of the cylinder injection amount as shown by the arrow Ya in FIG. 2. The fuel is injected at the initial injection distribution ratio Ai and the required lean limit air-fuel ratio (i.e., at the intersection point Pc between the dash line showing the initial injection distribution ratio Ai and the solid line showing the required lean limit in FIG. 3). By increasing the proportion of the cylinder injection amount, the amount of fuel injected in the compression stroke is increased, and the stratification of the air-fuel mixture is promoted. This ensures that the air-fuel mixture at the air-fuel ratio equal to or below the required lean limit is present around an ignition plug. When the proportion of the cylinder injection amount is increased, the amount of discharged HC is increased as compared to when the control is executed according to the target injection distribution ratio. However, the degree to which the amount of discharged HC is increased is smaller than that when the proportion of the port injection amount is increased.

Figure 3:
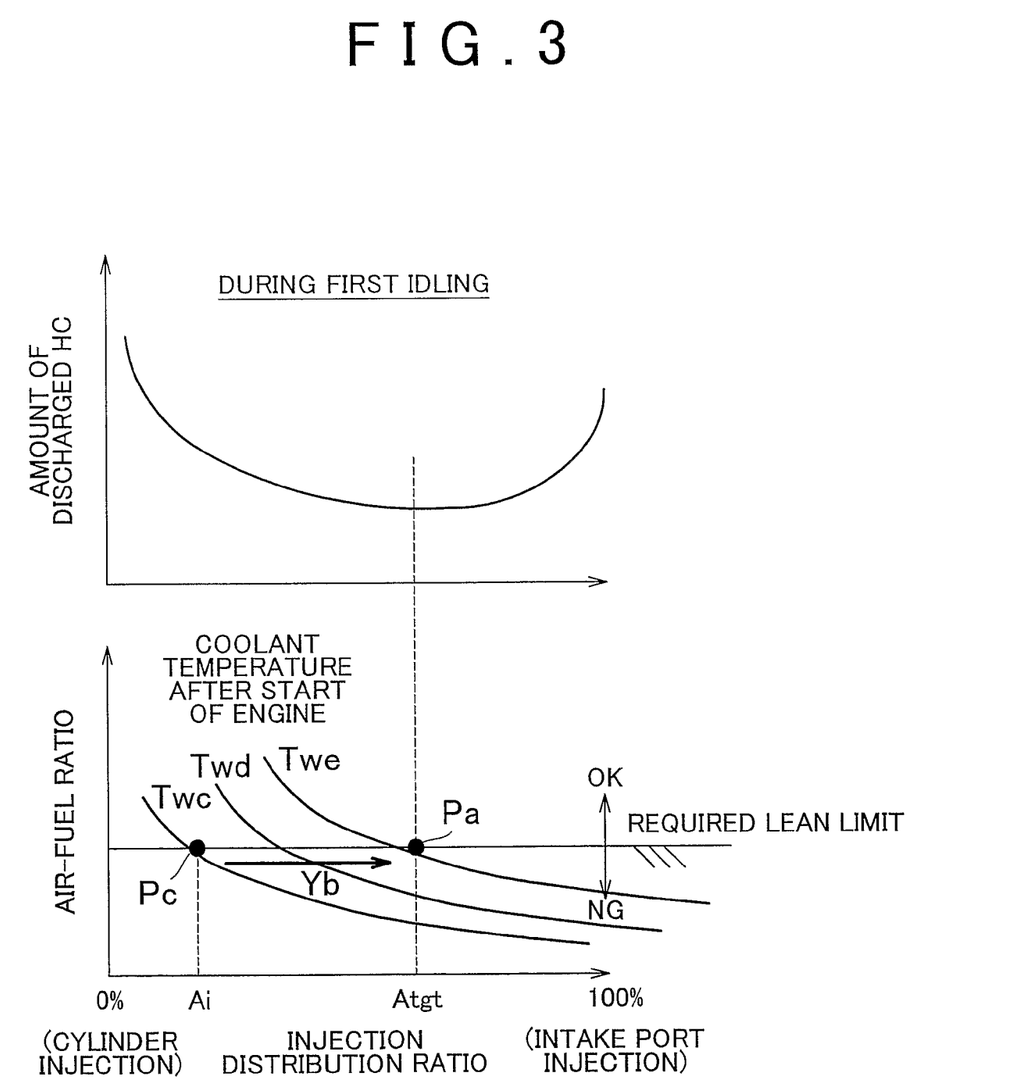
FIG. 3 is a diagram showing the relation between the injection distribution ratio and the amount of HC contained in the exhaust gas, and the relation between the injection distribution ratio and the air-fuel ratio, during first idling operation of the internal combustion engine, in the embodiment of the invention.

FIG. 3 shows the relation between the injection distribution ratio and the amount of HC contained in the exhaust gas discharged from the engine 1, and the relation between the injection distribution ratio and the air-fuel ratio, during first idling operation after the start of the engine 1. In FIG. 3, the horizontal axis indicates the injection distribution ratio, and the vertical axis indicates the amount of discharged HC, and the air-fuel ratio. The first idling operation is idling operation that is performed for the first time after the start of the engine 1 is successful. As shown in FIG. 3, the amount of discharged HC is smallest at the target injection distribution ratio Atgt also during the first idling. The lean limit gradually changes toward the lean side (i.e., the lean limit gradually increases) as the start-time coolant temperature increases in the order of Twc, Twd, and Twe (Twc<Twd<Twe). In this case, even when the injection distribution ratio is changed from the initial injection distribution ratio Ai to the target injection distribution ratio Atgt according to the increase in the coolant temperature, the air-fuel ratio is maintained at or below the lean limit to ensure the stability of the operation of the engine 1, and the amount of discharged HC is reduced. The fuel injection control apparatus in the embodiment controls the change in the injection distribution ratio from the initial injection distribution ratio Ai to the target injection distribution ratio Atgt, according to the invention.

Figure 4:
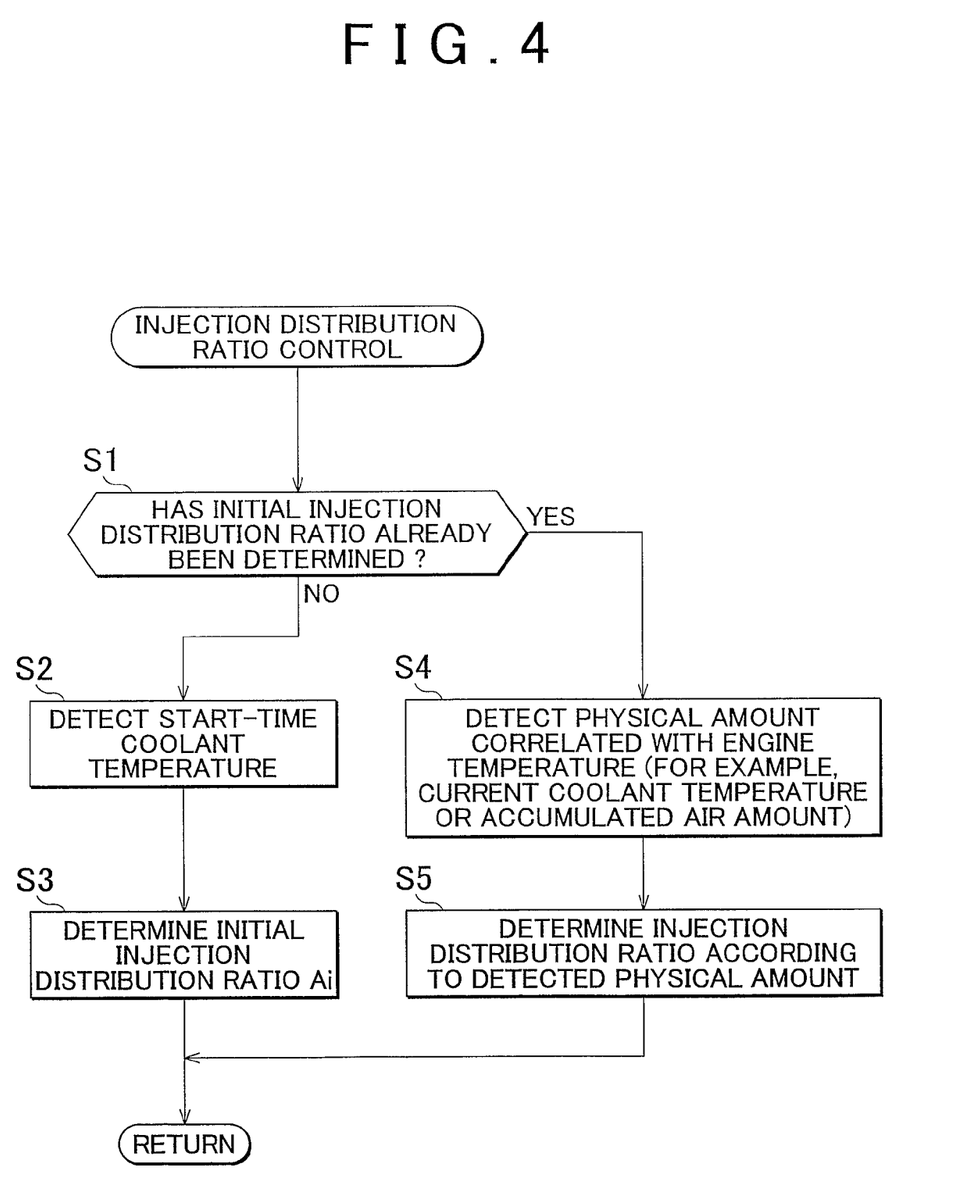
FIG. 4 is a diagram showing an injection distribution ratio control routine executed by an ECU shown in FIG. 1.
Figure 5:
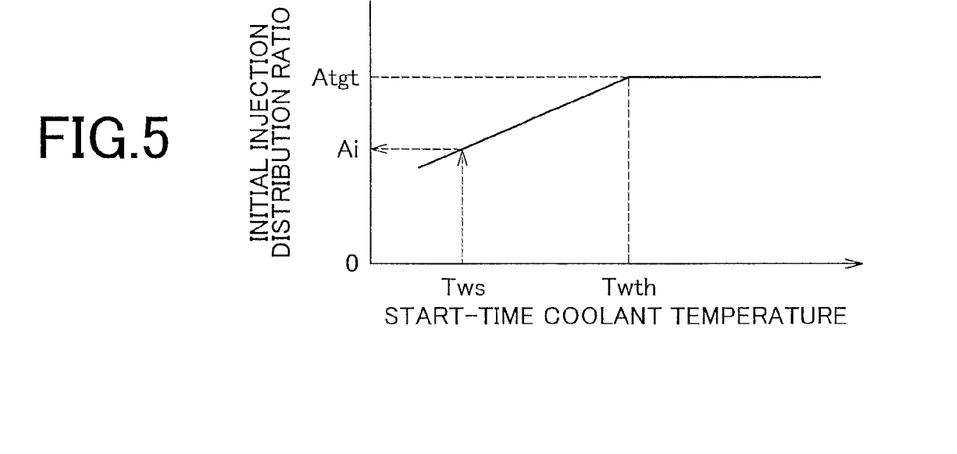
FIG. 5 is a diagram showing an example of the correspondence relation between a start-time coolant temperature and the initial injection distribution ratio in the embodiment of the invention.

FIG. 4 shows an injection distribution ratio control routine executed by the ECU 20 to control the injection distribution ratio. In the initial stage of a process of starting the engine 1, the routine is repeatedly executed at predetermined intervals. In step S1, the ECU 20 determines whether the initial injection distribution ratio Ai has already been determined. When it is determined that the initial injection distribution ratio Ai has not been determined, the routine proceeds to step S2. In step S2, the ECU detects the start-time coolant temperature based on the signal output from the coolant-temperature sensor 23. Then, the routine proceeds to step S3. In step S3, the ECU 20 determines the initial injection distribution ratio Ai, based on the start-time coolant temperature. For example, a map that describes the relation between the start-time coolant temperature and the injection distribution ratio as shown in FIG. 5 is prepared and stored in advance in the ROM of the ECU 20. The ECU 20 determines the initial injection distribution ratio Ai corresponding to a start-time coolant temperature Tws that is detected, according to the map. In this map, in a range where the start-time coolant temperature is below a predetermined temperature Twth (that is equivalent to the coolant temperature Twb in FIG. 2), as the start-time coolant temperature decreases, the initial injection distribution ratio Ai changes from the target injection distribution ratio Atgt so that the proportion of the cylinder injection amount increases. When the start-time coolant temperature is equal to or above the predetermined temperature Twth, the air-fuel ratio is maintained at or below the lean limit even if the injection distribution ratio is set to the target injection distribution ratio Atgt. Therefore, when the start-time coolant temperature is equal to or above the predetermined temperature Twth, the initial injection distribution ratio Ai is set to the target injection distribution ratio Atgt. When the initial injection distribution ratio Ai has been determined, a flag is set to show that the initial injection distribution ratio Ai has been determined. In step S1 in and after the next routine, it is determined that the initial injection distribution ratio Ai has already been determined by referring to the flag showing that the initial injection distribution ratio Ai has already been determined. After the initial injection distribution ratio Ai is set in step S3, the current routine ends.

In the routine executed after the initial injection distribution ratio Ai is determined, an affirmative determination is made in step S1. In this case, the routine proceeds to step S4. In step S4, the ECU 20 detects a physical amount correlated with the engine temperature. For example, a current coolant temperature, or an accumulated air amount, which is obtained by accumulating the amount of air from the time of the start of the engine, may be detected as the physical amount. The accumulated air amount may be obtained by accumulating the intake air amount detected by the airflow meter 22. In step S5, the ECU 20 determines the injection distribution ratio according to the physical amount detected in step S4. The injection distribution ratio may be determined based on a map that associates the physical amount with the injection distribution ratio.

Figure 6:
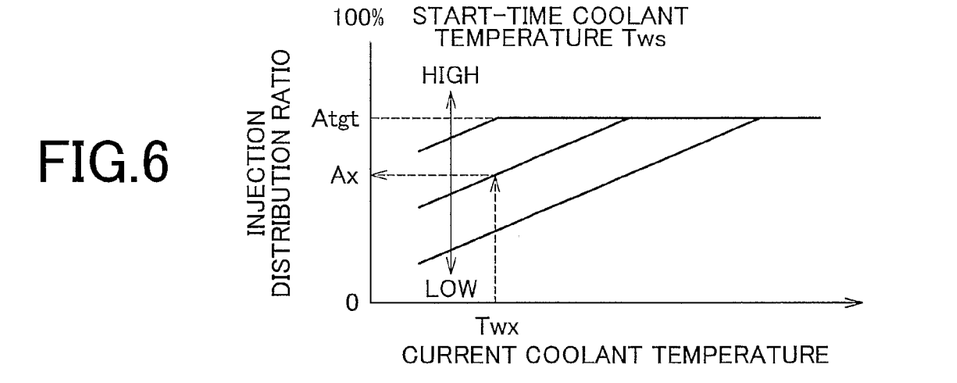
FIG. 6 is a diagram showing an example of the correspondence relation between a current coolant temperature and the injection distribution ratio in the embodiment of the invention.
Figure 7:
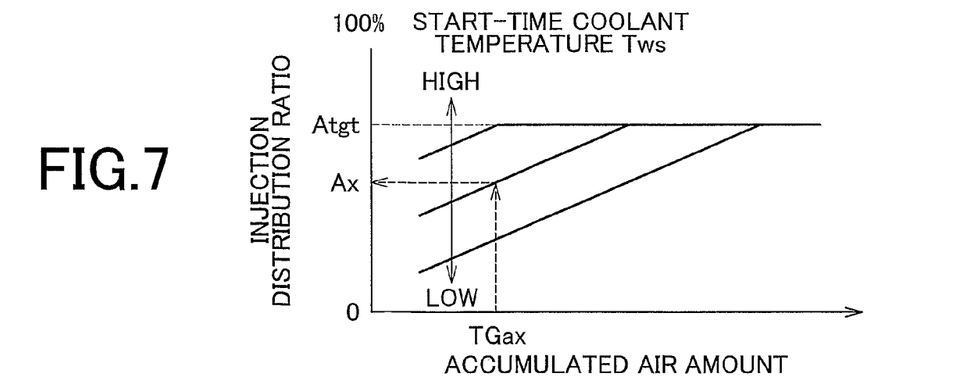
FIG. 7 is a diagram showing an example of the correspondence relation between an accumulated air amount and the injection distribution ratio in the embodiment of the invention.

For example, when the current coolant temperature is detected as the physical amount correlated with the engine temperature, a map as shown in FIG. 6 is prepared and stored in advance in the ROM of the ECU 20. The map shows the relation between the current coolant temperature and the injection distribution ratio. The relation changes according to the start-time coolant temperature Tws. Then, an injection distribution ratio Ax corresponding to a current coolant temperature Twx is determined based on the start-time coolant temperature Tws detected in step S2, and the current coolant temperature Twx detected in step S4. When the accumulated air amount is detected as the physical amount correlated with the engine temperature, a map as shown in FIG. 7 is prepared and stored in advance in the ROM of the ECU 20. The map shows the relation between the accumulated air amount and the injection distribution ratio. The relation changes according to the start-time coolant temperature Tws. Then, the injection distribution ratio Ax corresponding to an accumulated air amount TGax is determined based on the start-time coolant temperature Tws detected in step S2 and the accumulated air amount TGax detected in step S4. In each of the maps shown in FIGS. 6 and 7, the correspondence relation between the coolant temperature or the accumulated air amount and the injection distribution ratio is set so that the injection distribution ratio at which the amount of discharged HC is minimized is selected in a range where combustion is performed in the engine 1, that is, in a range where the air-fuel ratio is maintained at or below the lean limit.

After the injection distribution ratio is determined in step S5, the ECU 20 ends the current routine. When the injection distribution ratio is determined in the routine shown in FIG. 4, the ECU 20 controls the ratio between the amounts of fuel to be injected from the first injector 11 and the second injector 12 for one combustion stroke, according to the determined injection distribution ratio. The first injector 11 injects the fuel in the compression stroke.

In the above-described routine, when the temperature of the engine 1 is below the lower limit of a temperature range where the air-fuel ratio is maintained at or below the lean limit at the target injection distribution ratio Atgt (i.e., a range where the coolant temperature is equal to or above the predetermined temperature Twth in FIG. 5), the initial injection distribution ratio Ai is determined so that the proportion of the cylinder injection amount is increased as compared to the target injection distribution ratio Atgt, in step S3. This ensures that the air-fuel mixture at the air-fuel ratio equal to or below the lean limit is present around the ignition plug at the time of cold start. Thus, the engine 1 starts more reliably. When the initial injection distribution ratio Ai differs from the target injection distribution ratio Atgt, the injection distribution ratio is gradually changed toward the target injection distribution ratio Atgt according to the change in the physical amount correlated with the temperature of the engine 1. Therefore, it is possible to appropriately control the injection distribution ratio toward the target injection distribution ratio Atgt to ensure that the air-fuel mixture at the air-fuel ratio equal to or below the lean limit is present around the ignition plug, and to minimize the amount of discharged HC.

In the embodiment, the combination of the first injector 11 and the second injector 12 may be regarded as the fuel injection portion according to the invention. The ECU 20 may be regarded as the injection distribution ratio control portion according to the invention. When the ECU 20 executes steps S2 and S3 in FIG. 4, the ECU 20 functions as the initial injection distribution ratio setting portion according to the invention. When the ECU 20 executes steps S4 and S5 in FIG. 4, the ECU 20 functions as the change control portion according to the invention.

Figure 8:
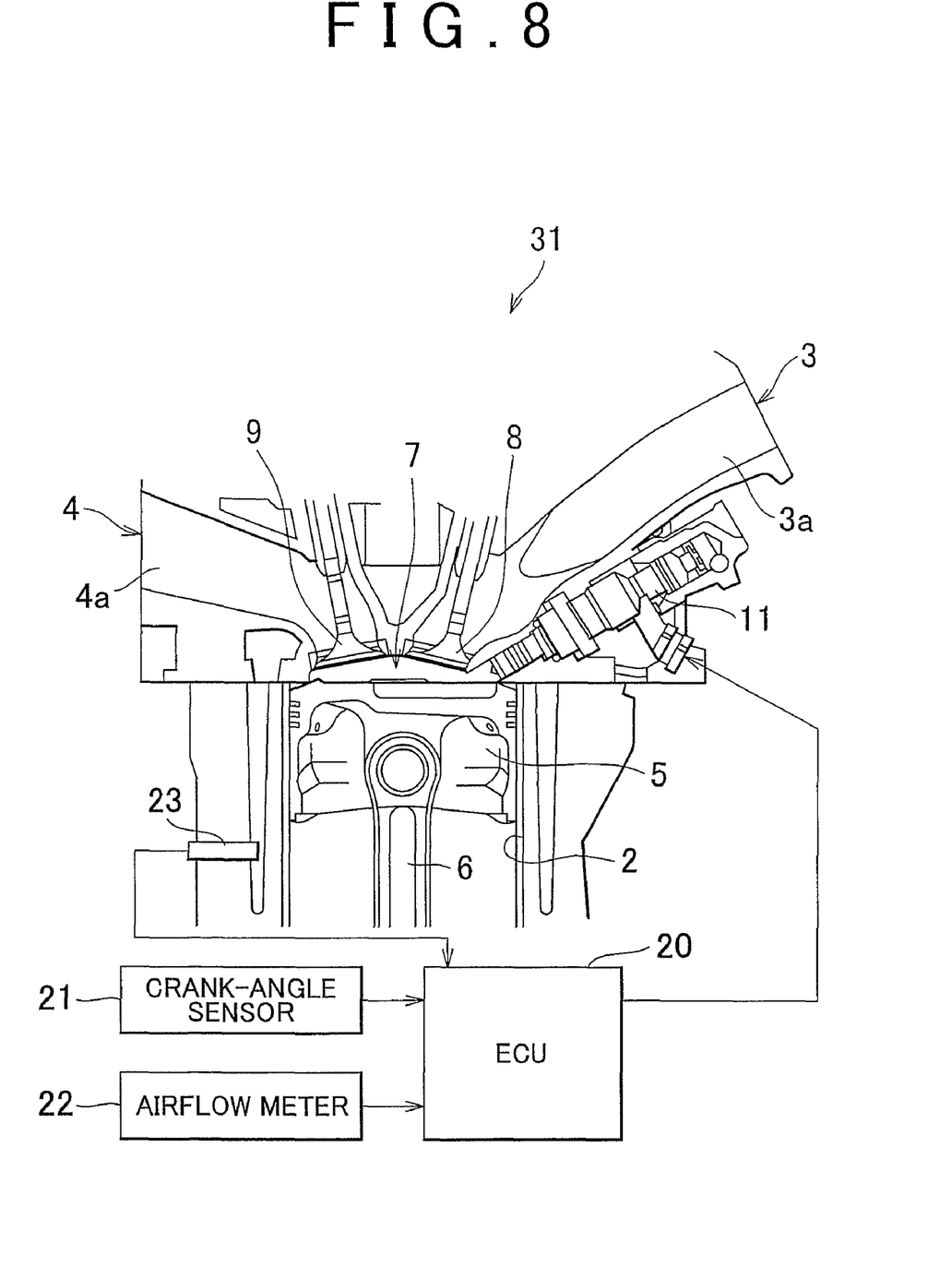
FIG. 8 is a diagram showing the main portion of an internal combustion engine to which a fuel injection control apparatus according to another embodiment of the invention is applied.

The invention is not limited to the above-described embodiment. The invention may be realized in various embodiments. For example, as shown in FIG. 8, the invention may be applied to an engine 31 in which only the injector 11 for cylinder injection is provided as the fuel injection portion that performs each of first fuel injection for performing stratified-charge combustion, and second fuel injection for performing homogeneous-charge combustion, and an injector for intake port injection is not provided. That is, in the engine 31 shown in FIG. 8, when the injector 11 injects the fuel in the intake stroke, the homogeneous-charge combustion is performed. When the injector 11 injects the fuel in the compression stroke, the stratified-charge combustion is performed. Accordingly, instead of the injection distribution ratio employed for the engine 1 shown in FIG. 1, an injection distribution ratio represented by Wdi/(Wdc+Wdi) is employed. That is, the injection distribution ratio is a value expressed in percentage, which is obtained by dividing a fuel amount Wdi by the sum (Wdc+Wdi) of a fuel amount Wdc and the fuel amount Wdi. The fuel amount Wdc is the amount of fuel to be injected from the injector 11 in the compression stroke, and the fuel amount Wdi is the amount of fuel to be injected from the injector 11 in the intake stroke. The ECU 20 controls the injection distribution ratio according to the steps shown in FIG. 4. Thus, it is possible to appropriately control the injection distribution ratio toward the target injection distribution ratio Atgt so that the air-fuel ratio is maintained at or below the lean limit, and the amount of discharged HC is minimized. The correspondence relation in the map shown in each of FIGS. 5 to 7 is changed according to the characteristics of combustion in the engine 31.

In the above-described embodiment, the invention is applied to the case where the initial injection distribution ratio set according to the engine temperature at the time of the start of the engine is changed toward the target injection distribution ratio during the first idling operation. However, the invention is not limited to this case. The invention may be appropriately applied to any case where the initial injection distribution ratio set based on an engine condition at the time of the start of the engine differs from the target injection distribution ratio set based on a predetermined engine condition after the start of the engine, and then the injection distribution ratio is changed toward the target injection distribution ratio after the start of the engine 1. In the embodiment, the initial injection distribution ratio is set to a value different from the target injection distribution ratio because of the restriction imposed by the lean limit. However, the reason for setting the initial injection distribution ratio to a value different from the target injection distribution ratio is not limited to this reason. The invention may be applied to a case where the initial injection distribution ratio needs to be set to a value different from the target injection distribution ratio because of the difference in the engine condition.

Further, in the above-described embodiment, the engine temperature is referred to, as the engine condition. However, the parameter that represents the engine condition is not limited to the engine temperature. The invention may be applied to cases where the injection distribution ratio is changed according to various parameters that represent the engine condition. Further, when the injection distribution ratio is controlled by referring to the engine temperature, the physical amount correlated with the engine temperature is not limited to the coolant temperature or the accumulated air amount. Various physical amounts correlated with the engine temperature may be referred to. For example, the temperature of the wall surface of the cylinder (cylinder wall surface temperature) or the temperature of the top surface of the piston has the greatest influence on the condition of combustion. Therefore, the temperature of the wall surface of the cylinder or the temperature of the top surface of the piston may be detected by sensors, or may be estimated based on the other physical amount. Then, the injection distribution ratio may be controlled by referring to the detected or estimated value. An average effective cylinder pressure in the internal combustion engine may be accumulated from the time of the start of the engine, and the injection distribution ratio may be controlled by referring to the accumulated value. In addition, the engine temperature or the engine condition may be detected or estimated using at least one of various physical amounts such as the temperature of exhaust gas, the temperature of the exhaust gas purification catalyst, the flow rate of exhaust gas, and the accumulated value of the fuel injection amount, and the injection distribution ratio may be controlled by referring to the detected value or the estimated value. The injection distribution ratio may be controlled by referring to a plurality of physical amounts.

What is claimed is:

1. A fuel injection control apparatus for an internal combustion engine, comprising:
    a fuel injection portion that performs each of first fuel injection for performing stratified-charge combustion, and second fuel injection for performing homogeneous-charge combustion; and
    an injection distribution ratio control portion that controls an injection distribution ratio that is a ratio between an amount of fuel to be injected in the first fuel injection for one combustion stroke, and an amount of fuel to be injected in the second fuel injection for the one combustion stroke,
    wherein the injection distribution ratio control portion controls the injection distribution ratio to a target injection distribution ratio that is set based on a predetermined engine condition, while the predetermined engine condition is occurring; and
    wherein the injection distribution ratio control portion includes
    i) an initial injection distribution ratio setting portion that sets an initial injection distribution ratio based on an engine condition at a time of start of the internal combustion engine, and
    ii) a change control portion that controls a change in the injection distribution ratio by referring to the engine condition after the start of the internal combustion engine, when the injection distribution ratio is changed from the initial injection distribution ratio to the target injection distribution ratio,
    wherein
    the target injection distribution ratio is set to the injection distribution ratio at which an amount of hydrocarbon discharged from the internal combustion engine is minimized when an engine temperature is in a predetermined temperature range; and
    when the engine temperature is below the lower limit of the predetermined temperature range, the initial injection distribution ratio setting portion sets the initial injection distribution ratio so that a proportion of the amount of fuel to be injected in the first fuel injection is increased as compared to the target injection distribution ratio.

2. The fuel injection control apparatus according to claim 1, wherein:
    the fuel injection portion includes a first injector that injects the fuel into a cylinder, and a second injector that injects the fuel into an intake port; and
    the first fuel injection is fuel injection from the first injector in a compression stroke, and the second fuel injection is fuel injection from the second injector.

3. The fuel injection control apparatus according to claim 1, wherein:
    the fuel injection portion includes an injector that injects the fuel into a cylinder; and
    the first fuel injection is fuel injection from the injector in a compression stroke, and the second fuel injection is fuel injection from the injector in an intake stroke.

4. The fuel injection control apparatus according to claim 1, wherein the change control portion controls the change in the injection distribution ratio by referring to a physical amount correlated with an engine temperature, as the engine condition.

5. The fuel injection control apparatus according to claim 4, wherein the change control portion refers to at least one of a temperature of coolant for the internal combustion engine and an accumulated value of an intake air amount, which is obtained by accumulating the intake air amount from the time of the start of the internal combustion engine, as the physical amount correlated with the engine temperature.

6. The fuel injection control apparatus according to claim 1, wherein when the engine temperature at the time of the start of the internal combustion engine is below the lower limit of the predetermined temperature range so that an air-fuel ratio is above a lean limit if the injection distribution ratio is controlled to the target injection distribution ratio, the initial injection distribution ratio setting portion sets the initial injection distribution ratio so that the proportion of the amount of fuel to be injected in the first fuel injection is increased until the air-fuel ratio is equal to or below the lean limit.

7. The fuel injection control apparatus according to claim 6, wherein the change control portion controls the change in the injection distribution ratio according to an increase in the engine temperature after the start of the internal combustion engine so that the injection distribution ratio at which the amount of discharged hydrocarbon is minimized is selected in a range where the air-fuel ratio is maintained at or below the lean limit.

8. The fuel injection control apparatus according to claim 1, wherein a sum of the amount of fuel to be injected in the first fuel injection performed by the fuel injection portion and the amount of fuel to be injected in the second fuel injection performed by the fuel injection portion is set to achieve an air-fuel ratio at which an exhaust gas purification rate is highest in the internal combustion engine.

9. A fuel injection control method for an internal combustion engine, in which first fuel injection is performed for performing stratified-charge combustion, and second fuel injection is performed for performing homogeneous-charge combustion; and an injection distribution ratio, which is a ratio between an amount of fuel to be injected in the first fuel injection for one combustion stroke, and an amount of fuel to be injected in the second fuel injection for the one combustion stroke, is controlled, the fuel injection control method comprising:
    controlling the injection distribution ratio to a target injection distribution ratio that is set based on a predetermined engine condition, when the internal combustion engine is in the predetermined engine condition;
    setting an initial injection distribution ratio based on an engine condition at a time of start of the internal combustion engine; and
    controlling a change in the injection distribution ratio by referring to the engine condition after the start of the internal combustion engine, when the injection distribution ratio is changed from the initial injection distribution ratio to the target injection distribution ratio,
    wherein the target injection distribution ratio is set to the injection distribution ratio at which an amount of hydrocarbon discharged from the internal combustion engine is minimized when an engine temperature is in a predetermined temperature range; and
    when the engine temperature is below the lower limit of the predetermined temperature range, the initial injection distribution ratio is set so that a proportion of the amount of fuel to be injected in the first fuel injection is increased as compared to the target injection distribution ratio.

10. The fuel injection control method according to claim 9, wherein the target injection distribution ratio is set to the injection distribution ratio at which an amount of hydrocarbon discharged from the internal combustion engine is minimized when an engine temperature is in a predetermined temperature range; and when the engine temperature is below the lower limit of the predetermined temperature range, the initial injection distribution ratio is set so that a proportion of the amount of fuel to be injected in the first fuel injection is increased as compared to the target injection distribution ratio.

11. The fuel injection control method according to claim 10, wherein when the engine temperature at the time of the start of the internal combustion engine is below the lower limit of the predetermined temperature range so that an air-fuel ratio is above a lean limit if the injection distribution ratio is controlled to the target injection distribution ratio, the initial injection distribution ratio is set so that the proportion of the amount fuel to be injected in the first fuel injection is increased until the air-fuel ratio is equal to or below the lean limit.

12. The fuel injection control method according to claim 11, wherein the change in the injection distribution ratio is controlled according to an increase in the engine temperature after the start of the internal combustion engine so that the injection distribution ratio at which the amount of discharged hydrocarbon is minimized is selected in a range where the air-fuel ratio is maintained at or below the lean limit.

13. A fuel injection control apparatus for an internal combustion engine, comprising:

fuel injection means for performing each of first fuel injection for performing stratified-charge combustion, and second fuel injection for performing homogeneous-charge combustion; and injection distribution ratio control means for controlling an injection distribution ratio that is a ratio between an amount of fuel to be injected in the first fuel injection for one combustion stroke, and an amount of fuel to be injected in the second fuel injection for the one combustion stroke, wherein the injection distribution ratio control means controls the injection distribution ratio to a target injection distribution ratio that is set based on a predetermined engine condition, when the internal combustion engine is in the predetermined engine condition, and wherein the injection distribution ratio control means includes i) initial injection distribution ratio setting means for setting an initial injection distribution ratio based on an engine condition at a time of start of the internal combustion engine, and ii) change control means for controlling a change in the injection distribution ratio by referring to the engine condition after the start of the internal combustion engine, when the injection distribution ratio is changed from the initial injection distribution ratio to the target injection distribution ratio, wherein the target injection distribution ratio is set to the injection distribution ratio at which an amount of hydrocarbon discharged from the internal combustion engine is minimized when an engine temperature is in a predetermined temperature range; and when the engine temperature is below the lower limit of the predetermined temperature range, the initial injection distribution ratio setting means for setting an initial injection distribution ratio sets the initial injection distribution ratio so that a proportion of the amount of fuel to be injected in the first fuel injection is increased as compared to the target injection distribution ratio.

* * * * *